United States Patent [19]
Medwin

[11] 4,219,888
[45] Aug. 26, 1980

[54] SURFACE ACOUSTIC SIGNAL DEFADER

[75] Inventor: Herman Medwin, Pebble Beach, Calif.

[73] Assignee: The United States of America as represented by the Secretary of the Navy, Washington, D.C.

[21] Appl. No.: 967,749

[22] Filed: Dec. 8, 1978

[51] Int. Cl.² .................... H04B 1/10; H04B 11/00
[52] U.S. Cl. .................................. 367/131; 367/97; 367/135; 367/901
[58] Field of Search ............... 340/6 R, 5 R; 325/322, 325/324, 473, 474; 367/97, 131, 135, 901

[56] References Cited

U.S. PATENT DOCUMENTS

| | | | |
|---|---|---|---|
| 3,202,968 | 8/1965 | Eady, Jr. et al. | 367/901 X |
| 3,392,336 | 7/1968 | Schroeder | 325/474 |

Primary Examiner—Richard A. Farley
Attorney, Agent, or Firm—R. S. Sciascia; Charles D. B. Curry; Francis I. Gray

[57] ABSTRACT

A surface acoustic signal defader for optimizing the signal received from underwater sound scattered from the ocean surface. The bandwidth of the underwater sound source is monitored and the frequency of maximum signal strength is identified. When the maximum signal strength frequency fades a predetermined amount, reception is switched to the signal of maximum anti-correlation. This process is continuous such that when the new frequency fades the anti-correlation process will determine the optimum frequency for the new fading condition, thus resulting in optimum reception of surface scattered underwater sound.

12 Claims, 2 Drawing Figures

FIG_1

SURFACE ACOUSTIC SIGNAL DEFADER

BACKGROUND OF THE INVENTION

1. Field of the Invention

The present invention relates generally to signal reception and amplification and more particularly to optimum reception of scattered underwater sound.

2. Description of Prior Art

In the field of underwater sound transmission, the "building and fading" of acoustic signals in the sea has been observed for decades. This phenomenon has been variously attributed to time-varying surface and/or bottom interference, internal waves, and thermal gradients. Regardless of the source, the fading is especially troublesome in underwater communications and in the detection of undersea objects.

As a result, current practice is to eliminate, as much as possible, all but the direct path relatively stable signal that enters an underwater receiver such as a hydrophone. All of the sound received from a source is thus not utilized and results in a loss of efficiency in detecting sound.

SUMMARY OF THE INVENTION

Accordingly, the present invention monitors the bandwidth of an underwater sound source and the frequency of maximum signal strength is identified. When the maximum signal strength frequency fades a predetermined amount, reception is switched to the signal of maximum anti-correlation. This process is continuous such that when the new frequency fades the anti-correlation process will determine the optimum frequency to switch to for the new fading condition thus resulting in optimum reception of surface scattered underwater sound.

Therefore, it is an object of the present invention to provide an improved method for receiving sound transmitted underwater.

Another object is to provide a system which makes optimum utilization of surface-scattered sound waves to decrease the effect of "building and fading" of a signal.

A further object of the invention is to increase the reception range or require less expensive and powerful underwater transmitters for the same range, because of the invention's efficient signal reception and processing.

Other objects and many of the attendant advantages of this invention will be readily appreciated by reference to the following detailed description when considered in connection with the accompanying drawing.

DESCRIPTION OF THE PREFERRED EMBODIMENT

Figure 1:
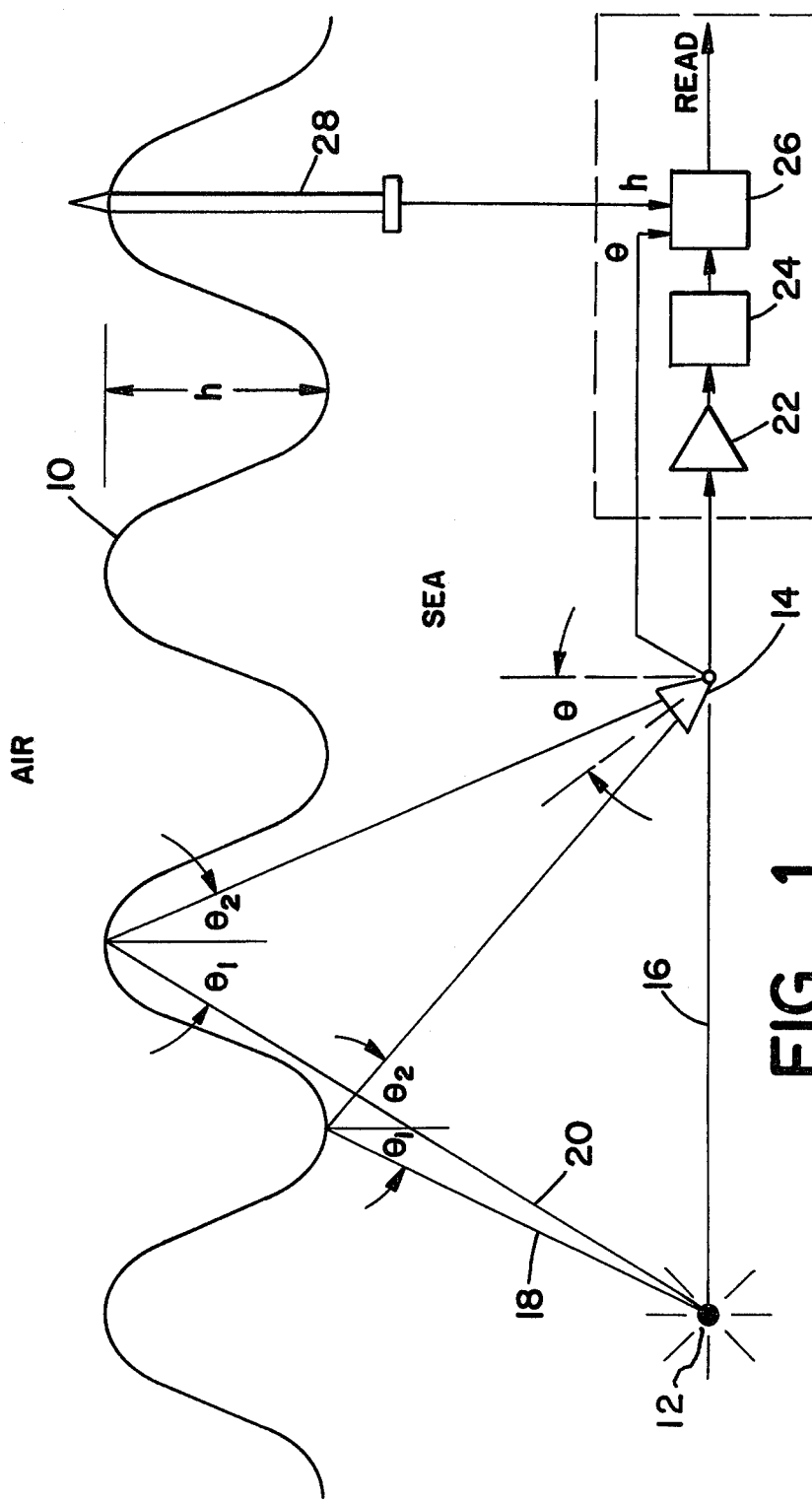
FIG. 1 is a pictorial diagram of the present invention in an underwater environment.

FIG. 1 illustrates the present invention in an undersea environment with ocean surface 10. Sound source 12 transmits sound underwater omnidirectionally. Transducer 14 detects the surface-scattered sound emanated by transmitter 12 as illustrated by rays 18 and 20. The output of the transducer 14 is then amplified by receiver 22. The output of the receiver 22 passes through analog-digital converter 24 to processor 26. It has been discovered, as will be explained below, that when a surface-scattered signal at one sound frequency fades, there are other frequencies whose amplitudes are increasing in strength. The effect is mutual, that is to say, the fluctuations of amplitude of particular frequencies of the surface scattered sound are anti-correlated with the fluctuations at another frequency. This anti-correlation is dependent upon the roughness of the ocean surface 10. For instance, over a certain effective ocean surface roughness there is a definite anti-correlation between a signal and its second harmonic. Hence the computer 26 also has an input from wave height sensor 28 to take into account the ocean surface roughness.

The present invention accepts sound signals received from the surface 10 at several frequencies. These are filtered and processed in order to identify the maximum signal strength frequency at a given instant. The strength of this signal of maximum amplitude is monitored. When it fades by a predetermined amount called the switching threshold, reception is switched to the signal of maximum anti-correlation, i.e., the signal frequency that is increasing most in strength as the monitored frequency is decreasing in strength. The amount of gain depends critically upon the proper switching threshold. The signal of maximum anti-correlation is determined by having the computer 26 run a continuous frequency fluctuation correlation. The process is continuous, that is, when the new frequency fades, the anti-correlation calculation will determine the optimum frequency for the new fading condition. The manner in which the correlation calculation, which is a correlation of the amplitudes at different frequencies as a function of the frequency ratio, is derived is described below.

Referring to FIG. 1, the ocean surface 10 is depicted as a perfect sinusoidal wave for illustrative purposes. Rays 18 and 20, which are specularly scattered, are incident on the surface 10 with total wave displacement "h" at angle of incidence $\theta_1$ and angle of reflection $\theta_2$. Because of the distances involved, the angle of incidence $\theta_1$ and the angle of reflection $\theta_2$ are essentially equal and are referred to as $\theta$. The path difference $\Delta r$ between the two rays is:

$$\Delta r = 2h \cos \theta \tag{1}$$

The phase difference $\Delta\phi$ between the two rays is:

$$\Delta\phi = 2\pi \Delta r/\lambda = 4\pi h/\lambda (\cos \theta) \tag{2}$$

where $\lambda$ is the wavelength of the sound rays 18 and 20. Now considering the surface displacement h to be varying randomly in time with RMS wave height $\sigma$, defined by $\sigma = h/2\sqrt{2}$, the variance of the phase difference is:

$$VAR(\Delta\phi) = [(4\pi/\lambda \cos \theta)^2][VAR(h(t))] \tag{3}$$

$$g = VAR(\Delta\phi) = (4\pi\sigma/\lambda \cos \theta)^2 \tag{4}$$

where $\sigma^2 = VAR(h(t))$

The quantity g is known as the roughness parameter for specular scatter. In more general form, the roughness parameter is:

$$g = [2\pi\sigma/\lambda(\cos \theta_1 + \cos \theta_2)]^2 \tag{5}$$

or $$g^{\frac{1}{2}} = 2\pi\sigma/\lambda(\cos \theta_1 + \cos \theta_2) \tag{6}$$

where $\theta_1$, and $\theta_2$ are the angles of incidence and reflection respectively. The description of the acoustical field in terms of g allows for comparison of data obtained from different surfaces, frequencies, and angles of incidence.

Considering again the phase difference $\Delta\phi = 4\pi h/\lambda \cos\theta$, and substituting $\sigma$, it is found that:

$$\Delta\phi = 2\sqrt{2}(4\pi\sigma)/\lambda \cos\theta = 2\sqrt{2}\ g^{\frac{1}{2}} \tag{7}$$

For complete interference $\Delta\phi = \pi$ and thus $$\pi = 2\sqrt{2}(g)^{\frac{1}{2}} \tag{8}$$

solving for $g^{\frac{1}{2}}$ one obtains: $g^{\frac{1}{2}} = 1.11$ for an amplitude minimum.

Therefore, for a sinusoidal surface complete cancellation could be expected when $g^{\frac{1}{2}} = 1.11$. Another way of looking at this situation is that the path difference is $\lambda/2$ at this frequency of interest. Now if the second harmonic of this primary frequency were also present, the path difference would be a full wavelength for the second harmonic. In this case the second haromic experiences constructive interference and an amplitude maximum would occur. This case is certainly oversimplified as the near Gaussian ocean surface has been modeled by a sinusoid of the frequency of maximum spectral density. Also, especially at higher frequencies, the reflection is much more complex than shown by the two rays 18 and 20. Nevertheless, experiments have established an anti-correlation between a fundamental frequency and its second harmonic in the range of $0.9 < g^{\frac{1}{2}} < 1.8$ as predicted by the above formula. That is, as the fundamental frequency was weakening, the second harmonic was increasing in strength. There was also a smaller steady gain at $g^{\frac{1}{2}} = 0.25$. Therefore, by switching from the maximum amplitude frequency as it is decreasing in strength to its second harmonic, optimum utilization of scattered signals is achieved.

Referring to FIG. 1, transducer 14 is movably mounted so that it may point in the best direction to receive the maximum reflected sound waves. A second transducer and appropriate processing equipment would be utilized to process directly received signals, such as ray 16, with which the present invention is not concerned. Alternatively and preferably a single segmented transducer with electronic switching functions and separate processing channels could be utilized to detect the reflected rays 18, 20 and the direct ray 16. Control of transducer movement or segment switching could be done electrically using a feedback network sensitive to directional signal strength. Processing of direct ray 16 would be handled in any one of several conventional methods presently available. As the novelty of the present invention rests in its unique optimum use of surface scattered sound, only the use of secondary rays is described.

Receiver 22 is a conventional type amplifier but may be any type amplifier that has the ability to amplify underwater signals received in a manner capable of being processed by an analog-digital converter. Analog-digital converter 24 is a conventional converter again compatible with the present invention.

Figure 2:
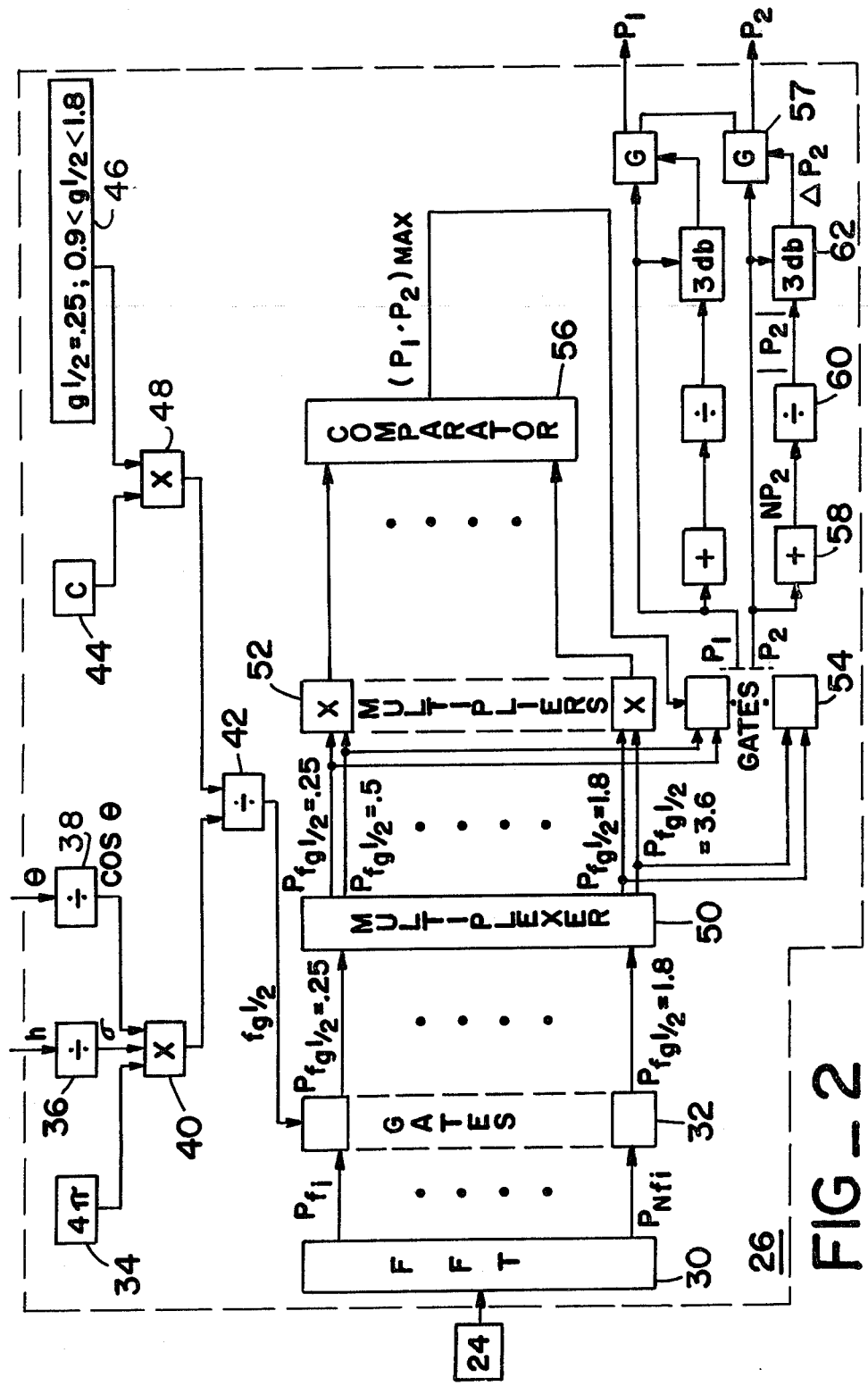
FIG. 2 is a block diagram of the analysis steps the present invention performs.

FIG. 2 illustrates the functions processor 26 performs. Processor 26 may be a specifically programmed general computer or preferrably a hardwired special computer. The processor 26 processes the analog-digital converter 24 output by performing a fast Fourier Transform (FFT), as depicted by 30. FFT's have previously been used by others for detection purposes to provide phase and amplitude information for each frequency being analyzed. Thus, referring to FIG. 2, spectral amplitude $P_{fi}$ represents the pressure amplitude of a sound ray at frequency $f_i$. $P_{2fi}$ represents the pressure amplitude at frequency $2f_i$ and so on for "N" frequencies of interest. The frequency interval may be any number depending upon the degree of resolution required and the capacity of the equipment. Each frequency being analyzed requires a separate computer channel. For instance, if it was desired to intercept sound rays in the frequency range of 0–2000 Hz, one could look at each 1 Hz frequency band, e.g., $P_i$ at 1 hz, $P_{2i}$ at 2 hz, $P_{3i}$ at 3 hz etc. Because the present invention uses the second harmonic of a fundamental frequency, in the example given, there would be 1000 combinations that the invention would monitor, e.g., $P_i$ at 1 Hz and its second harmonic $P_{2i}$ at 2 Hz up through $P_{1000i}$ at 1000 hz and its second harmonic $P_{2000i}$ at 2000 hz. Thus 1000 computer channels would be required. The separate channel outputs from 30 are fed into gates 32.

The next step the invention performs is to calculate the frequency combinations that will be at a maximum strength for the given ocean conditions.

Considering the formula:

$$g^{\frac{1}{2}} = 4\pi\sigma/\lambda \cos\theta \tag{9}$$

where $\theta_1 = \theta_2$, one can substitute the relationship $\lambda = c/f$ and solve for f, where c is velocity:

$$f = g^{\frac{1}{2}}c/4\pi\sigma \cos\theta \tag{10}$$

The analysis the processor 26 performs in solving this equation is depicted in the top of FIG. 2. In the denominator of the equation, $4\pi$ represented by 34 is a constant input. Waveheight h is passed through divider 36 resulting in the root mean square height $\sigma$, as defined by $\sigma = h/2\sqrt{2}$. The angle $\theta$ can be determined from the degree of the tilt of transducer 14 required to receive the maximum signal strength. The value of angle $\theta$ is passed through divider 38 resulting in $\cos\theta$. The outputs of 34 and dividers 36 and 38 are multiplied together in multiplier 40. The output of multiplier 40 is fed into divider 42 as a denominator. Considering the numerator of the equation, the speed of sound underwater c, depicted as a constant 44, is $1.5 \times 10^5$ cm/sec. As stated above, the values of $g^{\frac{1}{2}}$ for anti-correlation of a fundamental frequency with its second harmonic are $g^{\frac{1}{2}} = 0.25$ and $0.9 < g^{\frac{1}{2}} < 1.8$. Multiplexer 46 substitutes in values of $g^{\frac{1}{2}}$ in this range. The outputs of 44 and multiplexer 46 are multiplied together in multiplier 48. The output of multiplier 48 is fed into divider 42 as a numerator. Divider 42 solves the equation for f resulting in the fundamental frequency range computer 26 should monitor. This information is sent to each of the gates 32 which only allow pressure amplitude data for frequencies in this range through. For example, for the typical values given below, $g^{\frac{1}{2}} = 0.25$
$C = 1.5 \times 10^5$ cm/sec
$\sigma = 30$ cm
$\theta = 60°$ $$f_{g^{\frac{1}{2}} = .25} = \frac{(.25)(1.5 \times 10^5 \text{cm/sec})}{4(3.14)(30\text{cm})(.5)} = 199 \text{Hz} \tag{11}$$

Considering the range extremes, $$f_g^{\frac{1}{2}} = .9 = \frac{(.09)(1.5 \times 10^5 \text{cm/sec})}{4(3.14)(30\text{cm})(.5)} = 716.6\text{Hz} \quad (12)$$

$$f_g^{\frac{1}{2}} = 1.8 = \frac{(1.80)(1.5 \times 10^5 \text{cm/sec})}{4(3.14)(30\text{cm})(.5)} = 1433.3\text{Hz} \quad (13)$$

Thus the optimum frequencies are $f_{0.25} = 199$ and frequencies in the range $f_{0.9} = 716.6$ Hz to $f_{1.8} = 1433$ Hz. Because of the bandwidth of the example given, 0–2000 Hz, the processor 26 would only monitor frequencies $f_{0.25} = 199$ Hz and frequencies in the range $f_{0.9} = 716.6$ Hz to $f = 1000$ Hz.

The outputs of gates 32 are fed into controller multiplexer 50. Multiplexer 50 joins each fundamental frequency signal output with its second harmonic frequency signal in separate channels, e.g. $P_{fg^{\frac{1}{2}}=0.25}$ and $P_{fg^{\frac{1}{2}}=0.50}$, $P_{fg^{\frac{1}{2}}=0.9}$ and $P_{fg^{\frac{1}{2}}=1.8}$ etc.

The outputs of multiplexer 50 are fed into multipliers 52 and gates 54. Multipliers 52 form the products of amplitudes of the fundamental frequencies with their second harmonics: e.g.

$$(P_{fg^{\frac{1}{2}}=.25})(P_{fg^{\frac{1}{2}}=.50}) \quad (14)$$

$$(P_{fg^{\frac{1}{2}}=.9})(P_{fg^{\frac{1}{2}}=1.8}) \quad (15)$$

In general, define $$(P_{Ni})(P_{2Ni}) \equiv (P_1)(P_2) \quad (16)$$

where $P_1$ is the pressure amplitude of the fundamental frequency and $P_2$ is the pressure amplitude of the second harmonic. Comparator 56 cross-correlates the output products of multiplexer 52 and determines the maximum product $[(P_1)(P_2)]_{max}$.

The output of comparator 56 is sent to gates 54 which only allow $P_1$ and $P_2$ to pass. $P_1$ and $P_2$ then proceed to separate gates 57, separate adders 58, and separate comparators 62. Adders 58 add N number of $P_1$'s and $P_2$'s. Dividers 60 connected to the outputs of adders 58 divide the sums by N resulting in mean values $|P_1|$ and $|P_2|$. Comparators 62 compare the outputs $|P_1|$ and $|P_2|$ of dividers 60 with the instantaneous outputs $P_1$ and $P_2$ of gates 54 and monitor any deviation from the mean, e.g.

$$|P_1| - P_1 = \Delta P_1$$

$$|P_2| - P_2 = \Delta P_2$$

The processor 26 is programmed to switch at a predetermined deviation $\Delta P_1$ from the mean $|P_1|$ to the second harmonic amplitude $P_2$. This is called the switching threshold. The second harmonic frequency is then monitored, and when it decreases in strength $\Delta P_2$ a predetermined amount, the processor 26 switches back to the lower frequency $f_1$. The switching threshold may be at any value, e.g., 1, 2, or 3 db, optimum reception depending upon the given conditions and sound source characteristics.

For example, with the above given frequency range if the maximum product was achieved at frequencies 717 Hz and 1434 Hz, processor 26 would switch between these two frequencies to optimize signal reception. If ocean conditions changed such as a different waveheight h, the invention would calculate the frequency range for the new condition. The maximum product of $(P_1)(P_2)$ would be identified and the invention would switch back and forth between the new fundamental frequency and its second harmonic until conditions again change.

Obviously the actual optimum frequency could be a non whole number such as at 716.6 Hz. If greater accuracy was desired, a smaller frequency interval could be used. In addition, the computer could also calculate the high resolution (zoom) output at $f_1$ and $f_2$ by changing the listening time of the FFT 30, e.g., 1 second listening time results in approximately 1 Hz resolution, 2 seconds, $\frac{1}{2}$ Hz resolution, 3 seconds, $\frac{1}{3}$ Hz resolution etc.

Various modifications are contemplated and may obviously be restored to by those skilled in the art without departing from the spirit and scope of the invention, as hereinafter defined by the appended claims, as only a preferred embodiment thereof has been disclosed.

What is claimed is:

1. A surface acoustic signal defader for optimizing reception of surface scattered underwater sound signals comprising:
    (a) a directional transducer;
    (b) a receiver coupled to the output of said transducer;
    (c) an analog-digital converter coupled to the output of said receiver;
    (d) a Fast Fourier-Transform (FFT) digital processor coupled to the output of said converter, said processor providing a plurality of data outputs each containing pressure amplitude information of each of a predetermined number of frequencies;
    (e) means for determining and processing a plurality of optimum frequencies within said predetermined number of frequencies from which a maximum pressure amplitude can be derived, said determining and processing means being coupled to said FFT processor;
    (f) means for determining and monitoring said maximum pressure amplitude, said determining and monitoring means being coupled to said determining and processing means; and
    (g) means for switching from said maximum pressure amplitude frequency to a signal of maximum anticorrelation at a predetermined switching threshold, said switching means being coupled to said determining and monitoring means;
    whereby optimum reception of surface scattered underwater sound is achieved.

2. A surface acoustic signal defader as recited in claim 1 wherein said determining and processing means comprises:
    (a) a plurality of gates, one for each of said FFT processor data outputs; and
    (b) means for activating as a function of wave height, the angle of said directional transducer and the roughness parameter for specular scatter such ones of said gates to enable said optimum frequencies to be output to said determining and monitoring means.

3. A surface acoustic signal defader as recited in claim 2 wherein said activating means comprises:
    (a) a first multiplier to combine a first constant with said wave height and the cosine of said directional transducer angle;
    (b) a second multiplier to combine a second constant with said roughness parameter; and
    (c) a divider which divides the output of said second multiplier by the output of said first multiplier to produce gating signals which enable such gates as correspond to said optimum frequencies.

4. A surface acoustic signal defader as recited in claim 3 wherein said roughness parameter comprises a value selected from the group of numbers consisting of 0.25 and 0.9 to 1.8.

5. A surface acoustic signal defader as recited in claim 1 wherein said determining and monitoring means comprises:
   (a) means for combining each of said optimum frequencies with a corresponding anti-correlation frequency to form a plurality of output products;
   (b) means for selecting a maximum product from said output products; and
   (c) a plurality of product gates corresponding to each pair of said optimum frequencies and corresponding anti-correlation frequency, said maximum product activating the corresponding one of said product gates.

6. A surface acoustic signal defader as recited in claim 5 wherein each of said anti-correlation frequencies comprises the second harmonic of said corresponding optimum frequency.

7. A surface acoustic signal defader as recited in claim 1 wherein said switching means comprises:
   (a) a maximum signal channel to which is input said maximum pressure amplitude frequency;
   (b) an anti-correlation signal channel to which is input said maximum anti-correlation signal, each of said channels including means for obtaining the mean value of the input signal and including means for comparing the mean value with the instantaneous value of the input signal to determine the difference; and
   (c) means for alternating between the outputs of said channels when said difference of the channel currently providing an output exceeds said predetermined switching threshold.

8. A surface acoustic signal defader as recited in claim 7 wherein said predetermined switching threshold comprises a value of 3 db.

9. A method for optimizing reception of surface scattered underwater sound signals comprising the steps of:
   (a) receiving the maximum reflected sound waves via a movable transducer;
   (b) performing a Fast Fourier-Transform (FFT) on the received sound waves to provide a plurality of discrete pressure amplitudes over a specified frequency range;
   (c) selecting as a function of wave height, the angle of said transducer in a vertical plane, and the roughness parameter for specular scatter a plurality of optimum frequencies from said discrete pressure amplitudes;
   (d) analyzing the products of each optimum frequency with a corresponding anti-correlation frequency to determine a maximum pressure amplitude; and
   (e) switching between said maximum pressure amplitude and said corresponding anti-correlation frequency whenever the output signal strength falls below a predetermined threshold.

10. An optimizing method as recited in claim 9 wherein said selecting step comprises the steps of:
    (a) combining said wave height and said transducer angle to form a first product;
    (b) dividing said roughness parameter by said first product to form a gating signal; and
    (c) activating a plurality of gates according to the value of said gating signal corresponding to said optimum frequencies.

11. An optimizing method as recited in claim 9 wherein said analyzing step comprises the steps of:
    (a) forming said anti-correlation frequencies and combining said anti-correlation frequencies with corresponding ones of said optimum frequencies to form a plurality of second products;
    (b) comparing said second products to determine a maximum second product; and
    (c) enabling one of a plurality of product gates, said one product gate corresponding to said maximum pressure amplitude with its corresponding anti-correlation frequency.

12. An optimizing method as recited in claim 9 wherein said switching step comprises the steps of:
    (a) determining the mean value of said maximum pressure amplitude and of said corresponding anti-correlation frequency;
    (b) comparing each mean value with its corresponding instantaneous value to determine when the signal strength decreases below said predetermined threshold; and
    (c) alternating the output between said maximum pressure amplitude and said corresponding anti-correlation frequency whenever said predetermined threshold for the one outputting is exceeded.

* * * * *